United States Patent
Fox et al.

(10) Patent No.: US 11,516,137 B2
(45) Date of Patent: Nov. 29, 2022

(54) CONTENT PROPAGATION CONTROL

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Liam S. Harpur, Skerries (IE); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 806 days.

(21) Appl. No.: 16/421,359

(22) Filed: May 23, 2019

(65) Prior Publication Data
US 2020/0374232 A1    Nov. 26, 2020

(51) Int. Cl.
*H04L 47/24* (2022.01)
*H04L 45/302* (2022.01)
*G06N 3/08* (2006.01)
*G06N 3/04* (2006.01)

(52) U.S. Cl.
CPC .............. *H04L 47/24* (2013.01); *G06N 3/04* (2013.01); *G06N 3/08* (2013.01); *H04L 45/306* (2013.01)

(58) Field of Classification Search
CPC ....... H04L 45/08; H04L 45/306; H04L 47/24; H04L 47/2441; G06N 3/04; G06N 3/08; G06N 3/084; G06Q 30/0241–0277; G06Q 50/01
See application file for complete search history.

(56) References Cited

U.S. PATENT DOCUMENTS

| | | | |
|---|---|---|---|
| 7,996,535 B2 | 8/2011 | Auerbach | |
| 8,190,711 B1 | 5/2012 | Borodich | |
| 8,312,056 B1 | 11/2012 | Peng et al. | |
| 10,367,924 B2* | 7/2019 | Belikovetsky | H04L 45/34 |
| 10,992,585 B1* | 4/2021 | Gilman | H04L 47/2441 |
| 2011/0208760 A1 | 8/2011 | Cho et al. | |
| 2014/0237093 A1 | 8/2014 | Hofman et al. | |
| 2016/0364492 A1* | 12/2016 | Thomas | G06F 16/9535 |
| 2017/0223122 A1 | 8/2017 | Di et al. | |

(Continued)

OTHER PUBLICATIONS

Anonymous, "Simulation of Propagation for Social Channel Utilizing Predictive Analytics", IP.com Prior Art Database, Technical Disclosure IPCOM000234055D; Jan. 9, 2014, 3 pg.

(Continued)

*Primary Examiner* — Pao Sinkantarakorn
(74) *Attorney, Agent, or Firm* — Cuenot, Forsythe & Kim, LLC

(57) ABSTRACT

Content propagation control can include determining a classification of a message formatted for conveyance over a data communications network. The classification can be based on content of the message and determined using a classification model constructed by analyzing prior message propagation rates and corresponding propagation paths that are each associated with one of multiple message content types. Content propagation control also can include selecting propagation rate and propagation path control indicators based on the classification of the message determined using the classification model and embedding the propagation rate and propagation path control indicators in the message.

20 Claims, 7 Drawing Sheets

(56) References Cited

U.S. PATENT DOCUMENTS

2018/0174190 A1* 6/2018 Ferreira .................. G06Q 50/01
2018/0315083 A1* 11/2018 Makse ............... G06Q 30/0254
2021/0049441 A1* 2/2021 Bronstein ................ G06N 3/08

OTHER PUBLICATIONS

Wang, Z. et al., "Propagation-Based Social-Aware Multimedia Content Distribution", ACM Transactions on Applied Perception, vol. 2, No. 3, Article 1, May 2013, 20 pg.

Mell, P. et al., The NIST Definition of Cloud Computing, National Institute of Standards and Technology, U.S Dept of Commerce, Special Publication 800-145, Sep. 2011, 7 pg.

* cited by examiner

CONTENT PROPAGATION CONTROL

BACKGROUND

The present disclosure relates to the field of electronic communications, and more particularly, to propagation of electronic communications over data communication networks.

Data communication networks range from device-connected personal area networks (PANs) to the Internet, which connects countless individuals to devices and to each other. Using data communication networks, individuals can communicate and share information virtually instantaneously across the entire globe.

SUMMARY

A method can include determining, with a computer, a classification of a message formatted for conveying over a data communications network. The classification can be based on content of the message and determined using a classification model constructed by analyzing prior message propagation rates and corresponding propagation paths that are each associated with one of a plurality of message content types. The method also can include selecting propagation rate and propagation path control indicators based on the classification of the message determined using the classification model. Additionally, the method can include embedding the propagation rate and propagation path control indicators in the message.

A system includes a computer having at least one processor programmed to initiate executable operations. The executable operations can include determining a classification of a message formatted for conveying over a data communications network. The classification can be based on content of the message and determined using a classification model constructed by analyzing prior message propagation rates and corresponding propagation paths that are each associated with one of a plurality of message content types. The executable operations also can include selecting propagation rate and propagation path control indicators based on the classification of the message determined using the classification model. Additionally, the executable operations can include embedding the propagation rate and propagation path control indicators in the message.

A computer program product includes a computer-readable storage medium in which is stored program code, the program code executable by computer hardware to initiate operations. The operations can include determining a classification of a message formatted for conveying over a data communications network. The classification can be based on content of the message and determined using a classification model constructed by analyzing prior message propagation rates and corresponding propagation paths that are each associated with one of a plurality of message content types. The operations also can include selecting propagation rate and propagation path control indicators based on the classification of the message determined using the classification model. Additionally, the operations can include embedding the propagation rate and propagation path control indicators in the message.

DETAILED DESCRIPTION

Figure 1:
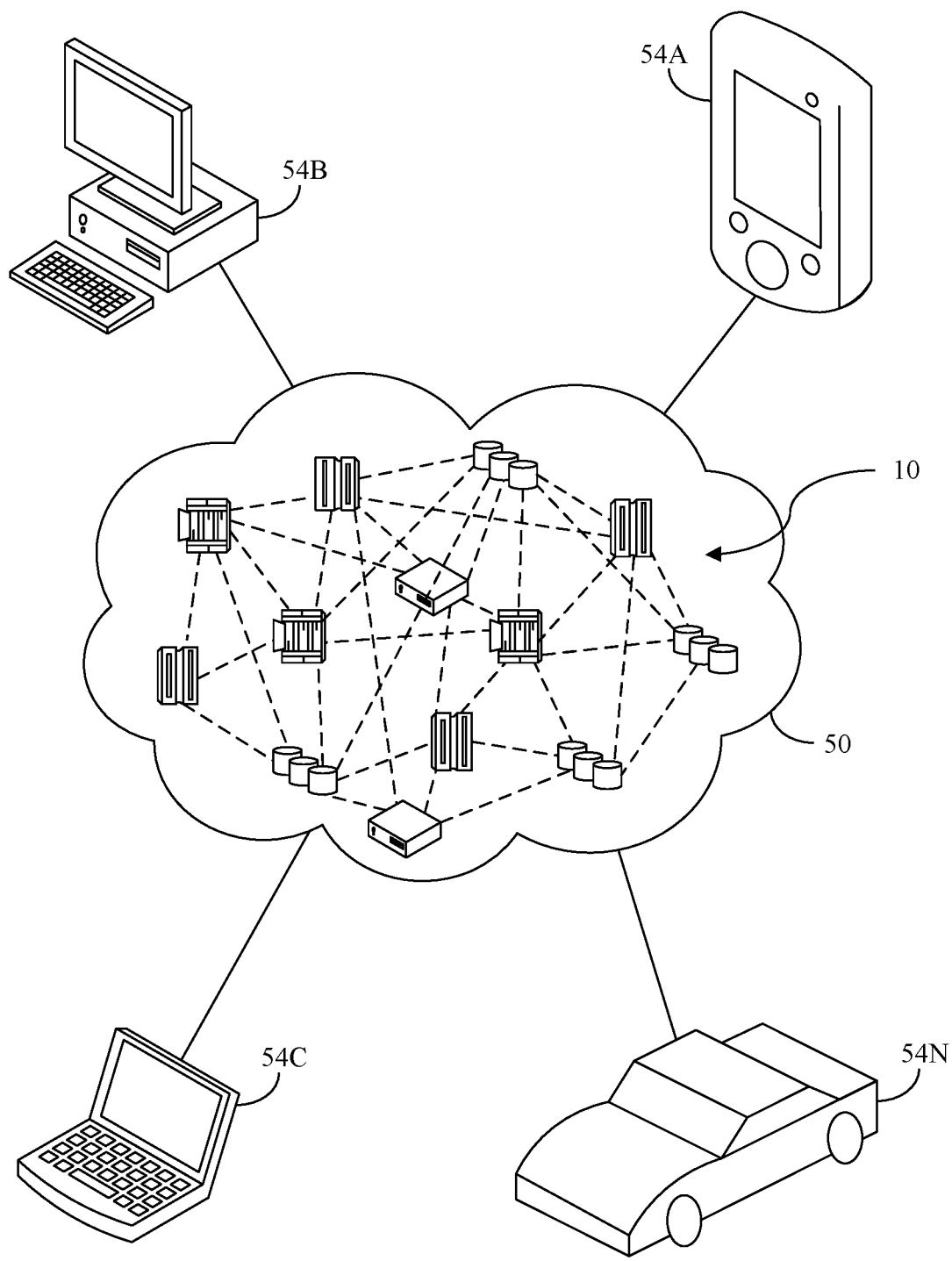
FIG. 1 depicts a cloud computing environment according to an embodiment of the present invention.

The ability to disseminate information widely and rapidly over a data communication network (e.g., local area network, wide area network, the Internet) can provide many advantages. Occasionally, however, electronic messages—whether documents, emails, collaboration chats, social network interactions, or other items—can travel too rapidly. There can be occasions and circumstances in which "going viral," is sub-optimal. In such instances, there is an advantage in measuring and controlling the propagation of an electronic message.

For example, a message over a collaboration channel may warrant immediate delivery to a select group of collaborators, but optimally be delayed for other collaborators not directly affected by the message. An advertisement of a pending sale may target a group of potential customers, but delivery of the advertisement over the Internet optimally may be delayed until just before the date of the sale to maximize the impact. In various other circumstances, given the specific content of a message, the message's propagation—that is the path over which the message is delivered and the timing of delivery—may significantly affect whether the intended impact of the message on a target audience is realized. Message flows can also affect network bandwidth usage. Accordingly, managing the path and timing the delivery of messages can assist in utilizing network bandwidth more efficiently.

The systems, methods, and computer program products disclosed herein autonomically and dynamically manage message propagation by imposing a differential serialization of messages. The differential involves selecting a propagation rate and corresponding propagate path of a message based on the message content. In a virtual sense, a message is infused with an "awareness" of when and where the message needs to be delivered depending on the purpose of the content of the message. For example, a system of message propagation control can determine that, based on content, a message to be posted over a data communication network is either to be posted immediately or otherwise held in a message queue for a time period before being relayed to one or more network nodes.

A system of message propagation control can be implemented in any network-connected computer, such as a server (e.g., cloud-based server), that communicates with one or more other computers over a data communications network. For example, message propagation control can be used in conjunction with or integrated in a content management system or a component of a cloud platform catalogue of offered services.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud-based computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
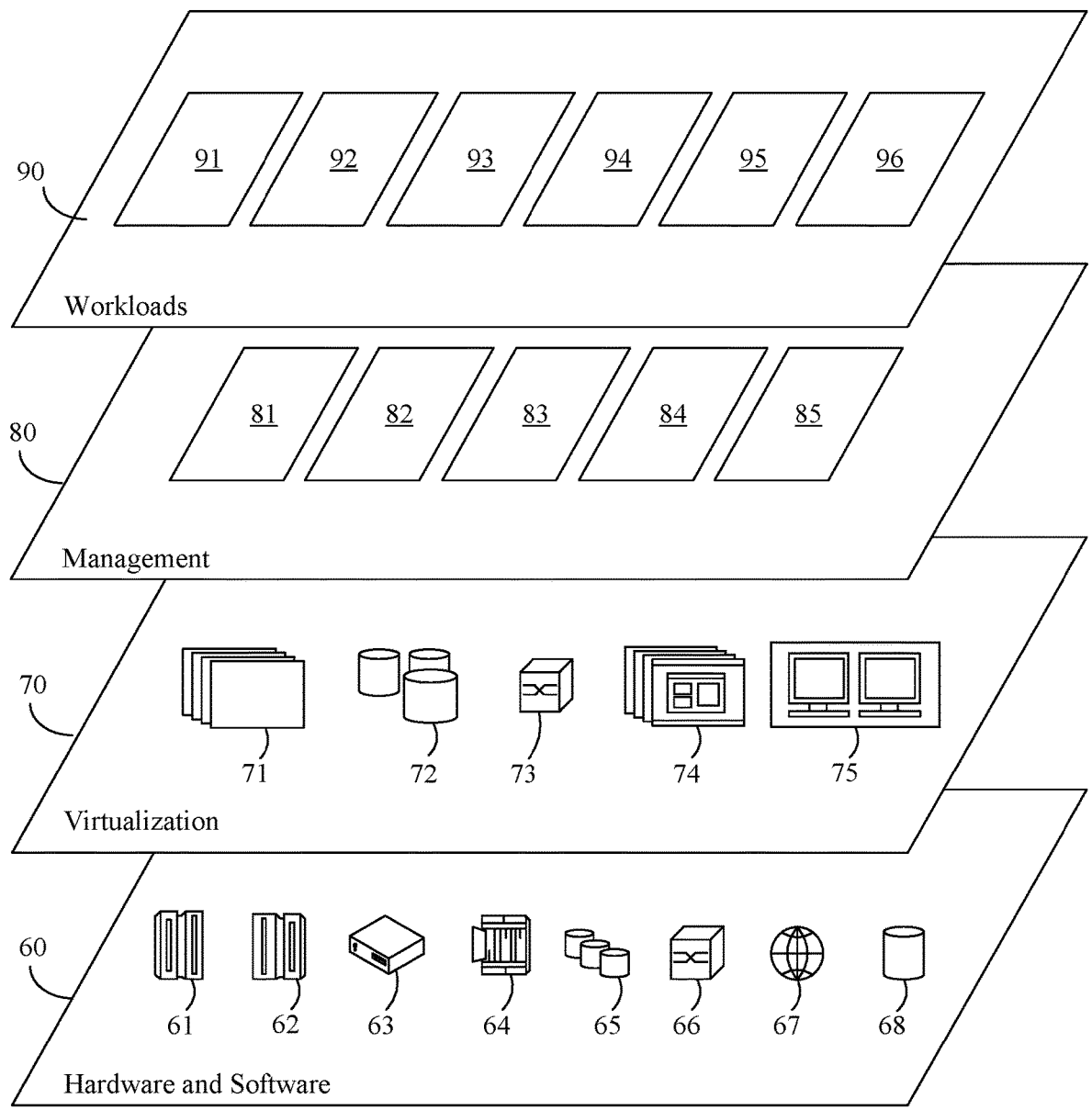
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content propagation control 96.

A system for content propagation control 96 can include deriving a propagation model based on an analysis of the propagation rates and propagation paths of prior messages grouped according to message content. As defined herein, "grouped according to content" means messages that pertain to one or more common topics, identified by topic modeling. Propagation rates are determined by interarrival times of messages posted to a data communication network. As defined herein, "propagation rate" (or "velocity") is a statistic or measure determined based on a collection of interarrival times of messages grouped according to content. The propagation model determines data values (control indicators) that the model predicts will optimally control the path and timing of delivery of a message given the purpose of the message content. Using the model-determined results, the system for content propagation control 96 imbues a message newly presented for posting with location and temporal awareness by adding the results to the message. As defined herein, "locational and temporal awareness" means a message embedded with data values (control indicators) to control the propagation path and propagation rate of the posting of the message over a data communications network.

The system for content propagation control 96, operating on a network-coupled computing node (e.g., server), manages message propagation by creating locational and temporal awareness based on content of the message. The awareness controls a message's propagation such that the message arrives at a location (e.g., computing node) at a time predicted by the model to be best-suited to the purpose of the message content.

Figure 3:
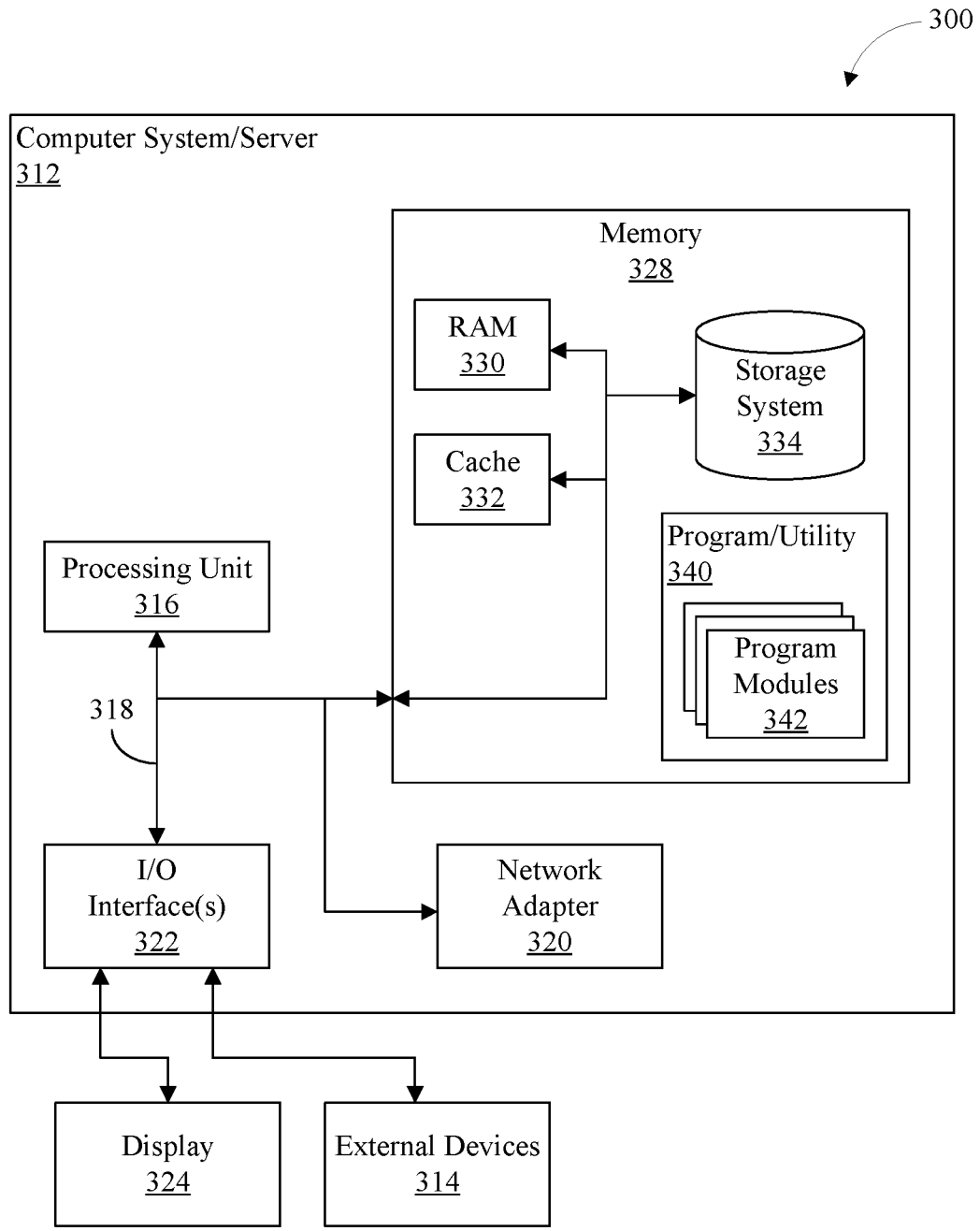
FIG. 3 depicts a cloud computing node according to an embodiment of the present invention.

Referring now to FIG. 3, a schematic of an example of a computing node is shown. Computing node 300 is only one example of a suitable computing node (e.g., cloud computing node) and is not intended to suggest any limitation as to the scope of use or functionality of embodiments described herein. Regardless, computing node 300 is capable of being implemented and/or performing any of the functionality set forth hereinabove.

Computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in computing node 300 is shown in the form of a general-purpose computing device. The components of computer 312 may include, but are not limited to, one or more processors 316, a memory 328, and a bus 318 that couples various system components including memory 328 to processor 316.

Processor 316 can comprise multiple cores that read and execute program instructions (processor-executable code) concurrently. For example, processor 116 can comprise four or eight cores, each of which core can separately execute multiple instructions of programs specifically designed for parallel processing and drawn from various application domains, including general-purpose applications and specific-purpose applications such as digital signal processing.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the described.

Computer 312 typically includes a variety of computer-readable media. Such media may be any available media that is accessible by computer 312, and includes both volatile and non-volatile media, removable and non-removable media.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may implement the system for content propagation control 96 or portions thereof. Program/utility 340 is executable by processor 316. Program/utility 340 and any data items used, generated, and/or operated upon by computing node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via input/output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
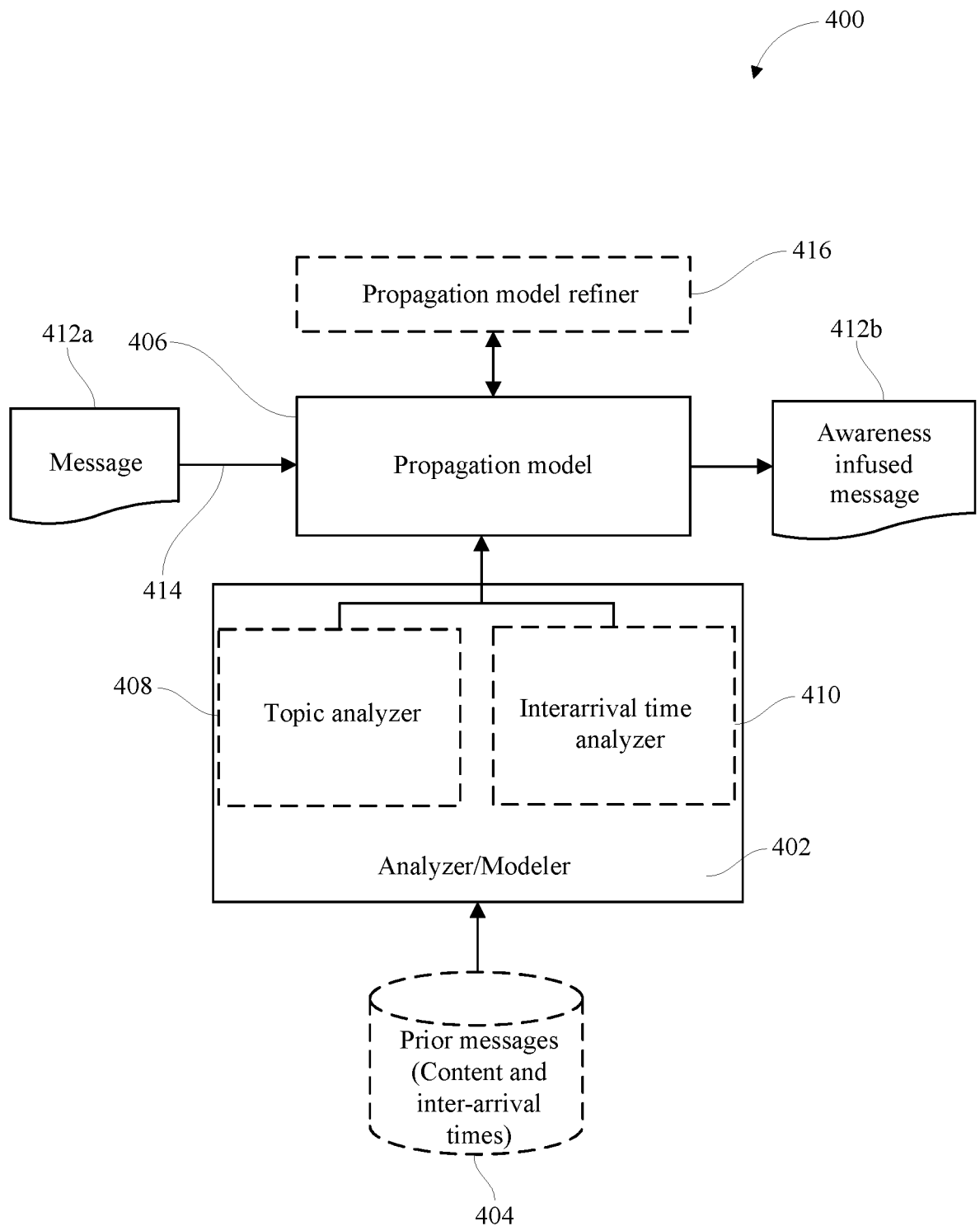
FIG. 4 depicts a content propagation control system according to an embodiment of the present invention.

FIG. 4 depicts one embodiment of a system 400 such as the system for content propagation control 96 described in the context of the workload and function examples illustrated in FIG. 2. System 400 illustratively includes analyzer/modeler 402 communicatively coupled to prior messages database 404. Analyzer/modeler 402 analyzes the prior messages, and based on the analysis, generates propagation model 406. Propagation model 406 is a model for identifying the type of the content of a message, and based on content type, determining a propagation rate and propagation path for the message when the message is conveyed over a data communications network.

In one embodiment, system 400 can be implemented in processor-executable code that resides on a server (e.g., cloud-based server) or other type of computer such as computer 312 of FIG. 3. Accordingly, as processor-executable code, system 400 can reside in a memory such as memory 328 of computer 312 and can execute on a processor such as processor 316 when conveyed to the processor via a bus such as bus 318. The server or computer, for example, can be communicatively coupled to a LAN, wide area network (WAN), the Internet, or any other type of data communications network.

Prior messages database 404, as illustrated, can be electronically stored on the same computer on which analyzer/modeler 402 resides, or alternatively, stored separately on a different device or system accessible via a data communications network (not explicitly shown). Prior messages can be gathered from various sources. For example, the prior messages can be gathered from emails, collaboration hubs, online platforms, social networking sites and a host of other networked computing nodes that send and receive electronic messages. Each prior message collected in prior messages database 404 comprises a textual rendering.

As electronically rendered text, individual messages comprise character strings representing words that can be analyzed using natural language processing. Analyzer/modeler 402 converts the prior messages collected in prior messages database 404 into machine-usable data. Analyzer/modeler 402 using the bag-of-words model, for example, can map prior messages into n-dimensional feature vectors that provide the inputs to analyzer/modeler 402 for generating propagation model 406. Propagation model 406 is generated, in part, based on message content topics identified by topic modeling and corpus linguistic analysis.

In one embodiment, analyzer/modeler 402 comprises topic analyzer 408 for identifying one or more topics that characterize the content of a message. Topic analyzer 408 can identify topics by performing topic modeling using latent Dirichlet allocation (LDA), for example. Given a specific number of topics, the LDA algorithm assigns a topic to each word in the collection of conversations and extracts topics based on the number of words of each topic present in each message. LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. Accordingly, the corpora of prior messages collected in prior messages database 404 and rendered as textual data can be, as with other text corpora, analyzed by analyzer/modeler 402 using LDA to identify topics and extract topical indicia from the prior messages.

Figure 5:
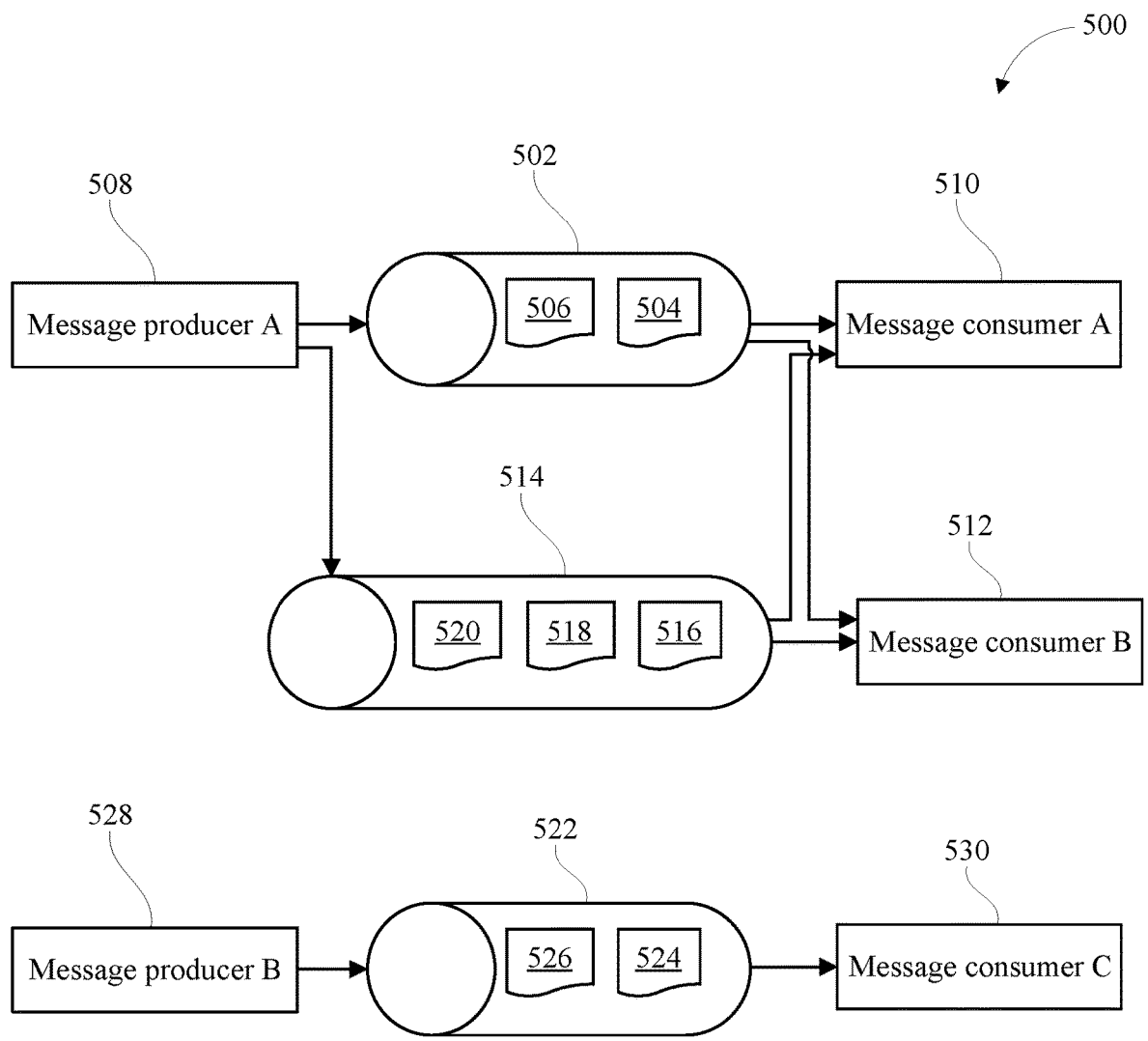
FIG. 5 depicts certain operative features of a content propagation control system according to an embodiment of the present invention.

Analyzer/modeler 402, in one embodiment, also comprises interarrival times analyzer 410, which analyzes the time between successive postings of messages on a data communications network (e.g., based on timestamps of successive postings of messages of a given type). Each sequence of messages is grouped according to model-determined content type (e.g., determined using topic modeling) such that each message in a group has the same content type. Referring additionally to FIG. 5, the determination of interarrival times for successive messages, grouped according to type, is illustrated. Illustratively, first group 502 of messages 504 and 506, identified by a first content type and transmitted by message producer A to message consumers A and B, traverses propagation paths from computing node 508 to computing nodes 510 and 512. Second group 514 of messages 516, 518, and 520, identified by a second content type and transmitted by message producer A to message consumers A and B, also traverses propagation paths from computing node 508 to computing nodes 510 and 512. Similarly, third group 522 of messages 524 and 526, identified by a third content type and transmitted by message producer B to message consumer C, traverses a propagation path from computing node 528 to computing node 530. In general, the interarrival times of messages, grouped according to content type, are computed as $$\Delta t_i^{(j)} = t_i^{(j+1)} - t_i^{(j)},$$

where $t_i^{(j)}$ is the time that the j-th message of model-identified content type i is posted on a data communications network. A group of n+2 messages yields the following set of n+1 interarrival times: $\{\Delta t_i^{(0)}, \Delta t_i^{(1)}, \Delta t_i^{(2)}, \ldots, \Delta_i^{(n)}\}$.

Interarrival times can be used to determine a propagation rate, or velocity, of content. One example, of a propagation rate of messages of a specific model-determined content type is the average (e.g., moving average over time) of interarrival times:

$$velocity_i = \frac{1}{n+1} \sum_{j=0}^{n} \Delta t_i^{(j)}.$$

Prior messages' propagation rates and paths corresponding to specific content type are used by analyzer/modeler 402 to generate propagation model 406. Propagation model 406 is used to determine data with respect to future message postings. Model-determined data can include, for example, distribution parameters and topic keywords determined to be most prevalent given a message's content type. The data can be included within a message to imbue the message with locational and temporal awareness. Propagation model 406 can be constructed to determine data values (control indicators) that the model predicts will optimally control the path and timing of delivery of the message given the purpose of the message content. Control indicators (e.g., prevalent keywords, distribution parameters) dictate for the specific data communications network the velocity and timing of delivery (propagation rate) of the message, and the message's route over the network (propagation path).

According to one embodiment, control indicators are distribution parameters and most prevalent keywords. Distribution parameters determine a probability density distribution (e.g., rate, shape, scale) for modeling interarrival times. The most prevalent keywords are those having the k-highest topic modeling scores. Topic modeling can provide a log-likelihood for each word of a message. The higher the log-likelihood, the more significant a word is in relation to an overall discourse to which the message pertains. Propagation model 406, accordingly, can be constructed to predict an optimal delivery of a message within a queue, given the topic relevancy of the message.

Referring still to FIG. 4, message 412a for future posting is received via data communication network 414 by system 400 and is converted to awareness infused message 412b by adding data (e.g., propagation rate and corresponding propagation path control indicators) determined by propagation model 406, as described above. In one embodiment, awareness infused messages held in message queues can be formatted according to JavaScript Object Notation (JSON). The following is a portion of an example JSON-formatted message to which have been added, based on a model-determined content type of the message, distribution parameters and the most prevalent topic keywords corresponding to the content type:

```
{
    "message": {
        "title": "example message",
        "MsgDiv":{
            "title": "Example Message Title",
            "prop_distribution": 95.041
            "prop_distribution_shape": 3
            "prop_distribution_scale": 5000
                "keyword1": 'propagation distribution'
                "keyword2": 'propagation distribution shape'
                "keyword3": 'propagation distribution scale'
        }
    }
}
```

With awareness infused in a message (propagation rate and corresponding propagation path control indicators added), the message posting obtains an awareness of a model-predicted optimal propagation time given the content of the message. For example, if a message is posted, based on the model-predicted optimal propagation time, the message can be held in a message queue for a model-determined time period or posted immediately, and thereafter relayed to multiple relay points (network-connected computer nodes) at a model-determined future time. Queue handling of awareness infused messages (e.g., JSON formatted messages), according to one embodiment, can be performed in a sending node, receiving node, and any intervening network nodes that support the locational and temporal awareness functionality on a path to the destination.

Propagation model 406, in one embodiment, is a classification model for classifying messages based on message content and constructed using machine learning. Various types of machine learning can be used in constructing the model. Using a classification learning algorithm, propagation model 406 takes a collection of labeled messages (a training set) as inputs and generates a model, which then takes unlabeled messages as inputs and outputs a model-determined label or probability for classifying the initially unlabeled messages based on message content.

Analyzer/modeler 402, in one embodiment, can use a deep neural network architecture to train propagation model 406. The training set can comprise messages culled from the prior messages database 404 converted to machine-usable feature vectors. In addition to message content type, propagation rates, and propagation paths of the prior messages, additional features optionally can be included in each feature vector. Additional features can include, for example, channels on which the message content was posted (e.g., email system, team collaboration hub, social network) and message timestamps at relay points along the paths traversed by the message. For messages of a given type, timestamps of message pairs at a specific point can be compared to determine the interarrival times of the messages of that type.

Propagation model can be used to identify goals of the message content (e.g., to inform, to persuade, to entertain) and the impact of the message content (e.g., determine whether the message content did inform, persuade, entertain, or otherwise accomplish the intended goal of the message content, such the model yields +1 if successful and −1 if not). A topic-classification model, for example, could be trained using a set of training examples, which in a pre-processing step are each labeled by a data analyst who determines and appropriately labels each training example according to the example's goal and impact (e.g., success or failure). Once trained, the model can classify an unlabeled feature vector representing a message according to a model-determined goal of the message and the message's likely impact.

Figure 6:
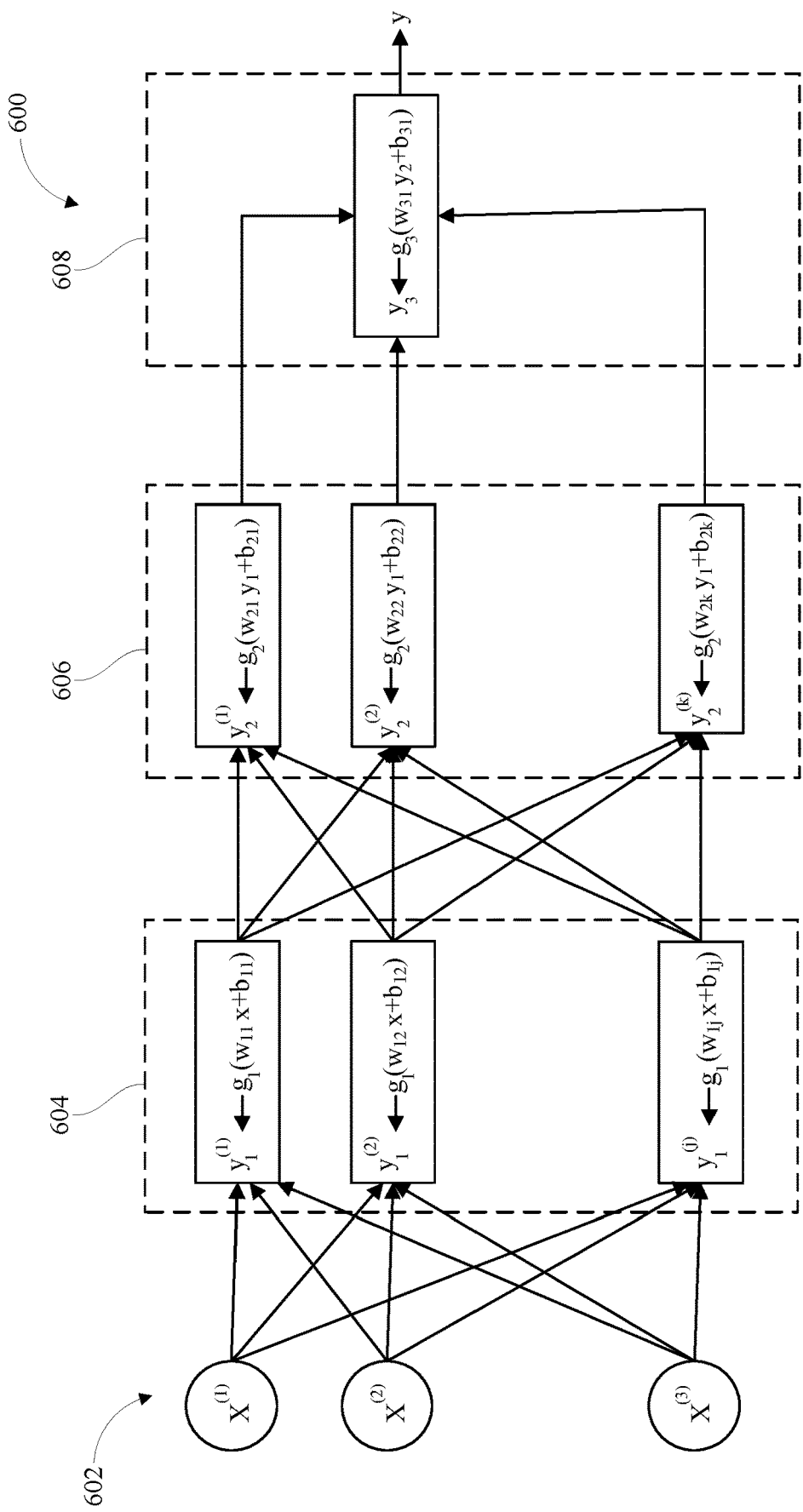
FIG. 6 depicts an example deep neural network architecture used in a content propagation control system according to an embodiment of the present invention.

Referring additionally to FIG. 6, a deep neural network architecture 600 according to one embodiment is depicted. Deep neural network architecture 600 illustratively comprises input layer 602, hidden layer 604, hidden layer 606, and output layer 608. Input layer 602 comprises each feature, $x^{(i)}$, of the input vector. (Features can include the features described above.) Each originating message is a sequence of words that can be converted to a vector, x, for input into input layer 602 using a known method such as term frequency-inverse document frequency (tf-idf), bag-of-words, or other frequency-based technique. The input vector to input layer 602, to hidden layer 604 and to output layer 608 is the output vector of the preceding layer. Each unit of hidden layers 604 and 606 and of output layer 608 applies a linear transformation, $(w_{ij} \cdot x + b_{ij})$ and $(w_{ij} \cdot y_j + b_{ij})$, and then applies an activation function, $g_i$, (e.g., a non-linear function) to each linearly transformed value, yielding $y_i^m \leftarrow g_i(w_{ij} \cdot x + b_{ij})$ and $y_i^m \leftarrow g_i(w_{ij} \cdot y_j + b_{ij})$. The weight vectors, $w_{ij}$, are learned by applying the backpropagation algorithm to the training set.

Propagation model 406 can be constructed using various other machine learning algorithms and statistical methods for determining data values (control indicators) that the model predicts will optimally control the path and timing of delivery of the message given the purpose of the message content. The data values imbue messages newly presented for posting with locational and temporal awareness.

Optionally, propagation model 406 can be trained using machine learning algorithms or statistical methods to identify key demographics of particular network user community population. The propagation velocity of a message can be based on the demographics of the particular network user community population and an identifiable relationship between targeted users and an original base audience. For example, an advertisement related to a new product offered by a business may be sent over the Internet to all known customers of the business. The propagation velocity of messages sent to specific customers who have purchased similar types of products may be modified to reach those customers more quickly than the business' other customers whose interest in the type of product is not as intense. Similarly, the velocity of a message sent over an enterprise LAN regarding an on-going project may be modified to reach employees directly involved in the project more rapidly than employees who have only a general interest in the project.

Optionally, system 400 can also include propagation model refiner 416 for refining propagation model 406 based on newly acquired information and data. The data drawn from prior messages collected in prior messages database 404 will typically contain random variations that can diminishes the prediction accuracy of propagation model 406. Propagation model 406 is constructed to determine data values (control indicators) that the model predicts will optimally control the path and timing of delivery of a message given the purpose of the message content. That is, the data values added to a message newly presented for posting imbue the message with location and temporal awareness. Propagation model refiner 416 assesses the prediction accuracy of propagation model 406 based on observed timing and propagation paths of messages posted on a data communications network. The observations can be fed into propagation model refiner 416, which updates propagation model 406 accordingly. For example, propagation model refiner 416 can revise the classification model based on interarrival times and propagation paths of messages that are observed during transmittal of the messages over a data communications network.

Figure 7:
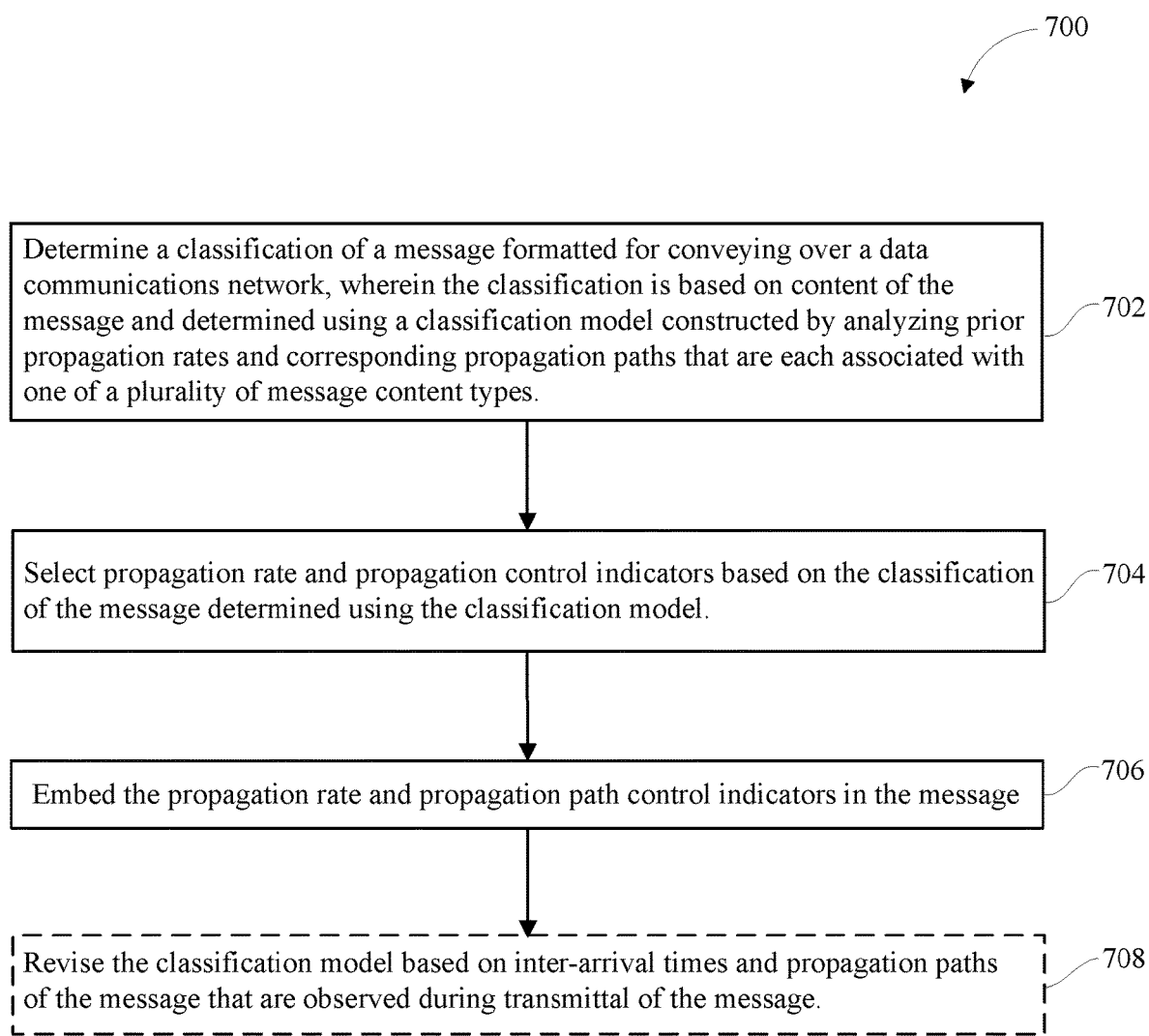
FIG. 7 is a flowchart of a method of content propagation control according to an embodiment of the present invention.

FIG. 7 is a flowchart of method 700, according to one embodiment. Method 700 is a method for content propagation control and can be performed by a system the same as or similar to the systems described in reference to FIGS. 1-6 The method can begin with the system receiving a message formatted for conveyance over a data communications network. At 702, the system determines a classification of the message. The classification is based on content of the message and is determined using a classification model constructed by analyzing prior message propagation rates and corresponding propagation paths that are each associated with a specific content type from among multiple types of message content.

The system at 704 selects propagation rate and propagation path control indicators based on the classification of the message, as determined using the classification model. Control indicators dictate for the specific data communications network the velocity and timing of delivery (propagation rate) of the message, and the message's route over the network (propagation path). At 706, the system embeds the propagation rate and propagation path control indicators in the message. The propagation rate and propagation path control indicators control when the message arrives via which paths at which computing nodes.

In one embodiment, analyzing the prior propagation rates and corresponding propagation paths of prior messages includes determining a topic associated with each message's content type. Determining a topic associated with each message's content type is based on topic modeling. Based on the determined content type of each message, interarrival times of postings of prior message is analyzed for each message content type.

The classification model, in one embodiment, is constructed using machine learning to train the model using prior messages. For example, the system can train the model using machine learning based on a deep neural network architecture.

Optionally, at 708, the system can revise the classification model. The classification model can be revised based on interarrival times and propagation paths of the message that are observed during transmittal of the message. The classification model can be revised to eliminate or mitigate the effect of random variations in prior message propagation rates and corresponding propagation paths used to construct the model.

Method 700 can further include modifying a propagation velocity of a message newly presented for posting. Modifying the propagation velocity can change an expected content sharing rate of the message. For example, the system can provide an override capability that allows a user to increase or decrease the model-determined propagation velocity.

Additionally, method 700 can include modifying a propagation velocity of the message based on demographics of a network user community population. For example, the system can determine, based on prior communications, an identifiable relationship between targeted users and an original base audience. Based on the relationship discovered by the system, the system can increase or decrease the propagation rate of one or more messages newly presented for posting.

Each of the various method embodiments of content propagation control can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-7 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
    determining, with a computer, a classification of a message formatted for conveying over a data communications network, wherein the classification is based on content of the message and determined using a classification model constructed by analyzing prior message propagation rates and corresponding propagation paths that are each associated with one of a plurality of message content types;
    selecting propagation rate and propagation path control indicators based on the classification of the message determined using the classification model; and
    embedding the propagation rate and propagation path control indicators in the message.

2. The method of claim 1, wherein the analyzing prior message propagation rates and corresponding propagation paths includes determining a topic associated with each message content type based on topic modeling and for each message content type analyzing interarrival times of postings of prior messages.

3. The method of claim 1, further comprising revising the classification model based on interarrival times and propagation paths of the message that are observed during transmittal of the message.

4. The method of claim 1, further comprising modifying a propagation velocity of the message to change an expected content sharing rate of the message.

5. The method of claim 1, further comprising modifying a propagation velocity of the message based on demographics of a network user community population and an identifiable relationship between targeted users and an original base audience.

6. The method of claim 1, wherein the classification model is constructed using machine learning to train the classification model using prior messages.

7. The method of claim 6, wherein the machine learning is a based on a deep neural network architecture.

8. A system, comprising:
    a computer having at least one processor programmed to initiate executable operations, the executable operations including:
        determining a classification of a message formatted for conveying over a data communications network, wherein the classification is based on content of the message and determined using a classification model constructed by analyzing prior message propagation rates and corresponding propagation paths that are each associated with one of a plurality of message content types;
        selecting propagation rate and propagation path control indicators based on the classification of the message determined using the classification model; and
        embedding the propagation rate and propagation path control indicators in the message.

9. The system of claim 8, wherein the analyzing prior message propagation rates and corresponding propagation paths includes determining a topic associated with each message content type based on topic modeling and for each message content type analyzing interarrival times of postings of prior messages.

10. The system of claim 8, wherein the executable operations further include revising the classification model based on interarrival times and propagation paths of the message that are observed during transmittal of the message.

11. The system of claim 8, wherein the executable operations further include modifying a propagation velocity of the message to change an expected content sharing rate of the message.

12. The system of claim 8, wherein the executable operations further include modifying a propagation velocity of the message based on demographics of a network user community population and an identifiable relationship between targeted users and an original base audience.

13. The system of claim 8, wherein the classification model is constructed using machine learning to train the classification model using prior messages.

14. A computer program product, comprising:
    a computer-readable storage medium having program code stored thereon, the program code executable by computer hardware to initiate operations including:
        determining a classification of a message formatted for conveying over a data communications network, wherein the classification is based on content of the message and determined using a classification model constructed by analyzing prior message propagation rates and corresponding propagation paths that are each associated with one of a plurality of message content types;
        selecting propagation rate and propagation path control indicators based on the classification of the message determined using the classification model; and
        embedding the propagation rate and propagation path control indicators in the message.

15. The computer program product of claim 14, wherein the analyzing prior message propagation rates and corresponding propagation paths includes determining a topic associated with each message content type based on topic modeling and for each message content type analyzing interarrival times of postings of prior messages.

16. The computer program product of claim 14, wherein the operations further include revising the classification model based on interarrival times and propagation paths of the message that are observed during transmittal of the message.

17. The computer program product of claim 14, wherein the operations further include modifying a propagation velocity of the message to change an expected content sharing rate of the message.

18. The computer program product of claim 14, wherein the operations further include modifying a propagation velocity of the message based on demographics of a network user community population and an identifiable relationship between targeted users and an original base audience.

19. The computer program product of claim 14, wherein the classification model is constructed using machine learning to train the classification model using prior messages.

20. The computer program product of claim 19, wherein the machine learning is a based on a deep neural network architecture.

* * * * *